United States Patent
Saitou et al.

(10) Patent No.: US 7,318,789 B2
(45) Date of Patent: Jan. 15, 2008

(54) HYDRAULIC CONTROL SYSTEM FOR AUTOMATIC TRANSMISSION

(75) Inventors: Yuuji Saitou, Fuji (JP); Masahiro Iwanabe, Fuji (JP)

(73) Assignee: Jatco Ltd (JP)

( * ) Notice: Subject to any disclaimer, the term of this patent is extended or adjusted under 35 U.S.C. 154(b) by 287 days.

(21) Appl. No.: 11/092,043

(22) Filed: Mar. 29, 2005

(65) Prior Publication Data

US 2005/0221956 A1   Oct. 6, 2005

(30) Foreign Application Priority Data

Mar. 30, 2004   (JP) ............... 2004-101168

(51) Int. Cl.
*F16H 61/00* (2006.01)
*G06F 7/00* (2006.01)

(52) U.S. Cl. ........................... 477/143; 701/58

(58) Field of Classification Search ............... 475/118, 475/120, 117; 477/143, 127, 128, 154; 701/58, 701/59, 60, 61
See application file for complete search history.

(56) References Cited

U.S. PATENT DOCUMENTS

| | | | |
|---|---|---|---|
| 5,683,328 A | * | 11/1997 | de Schepper et al. ....... 477/120 |
| 6,041,275 A | * | 3/2000 | Takiguchi ................ 701/55 |
| 6,543,593 B2 | * | 4/2003 | Saito ...................... 192/48.4 |
| 6,997,843 B2 | * | 2/2006 | Saitou ..................... 475/269 |
| 2004/0092365 A1 | * | 5/2004 | Kwon et al. ............... 477/143 |

FOREIGN PATENT DOCUMENTS

| | | | |
|---|---|---|---|
| JP | 62-41460 A | | 2/1987 |
| JP | 409280354 A | * | 10/1997 |
| JP | 02000088090 A | * | 3/2000 |

* cited by examiner

*Primary Examiner*—Roger Pang
(74) *Attorney, Agent, or Firm*—Rossi, Kimms & McDowell LLP

(57) ABSTRACT

An automatic transmission has an electronic control unit and a hydraulic control unit. The electronic control unit outputs an engagement command pressure to a solenoid disposed in a hydraulic control unit to generate a shelf pressure to upshift the automatic transmission. The engagement command pressure is corrected downwardly when the maximum rate of the gear ratio change is larger than the rate of change of a thrust-up determination gear ratio, and upwardly when the maximum rate of the gear ratio change is smaller than the rate change of a prolongation determination gear ratio. By correcting the engagement command pressure using the maximum rate of the gear ratio change, a proper output shaft torque wave form can be obtained so that a fluctuation of an output shaft torque during a torque phase while upshifting has no strong influence on the acceleration of a vehicle to achieve a comfortable shift feeling.

9 Claims, 11 Drawing Sheets

Fig. 2

|  | R/C | H/C | L/C | L&R/B | L/OWC | 2-4/B |
|---|---|---|---|---|---|---|
| 1st |  |  | ○ | ◌ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

HYDRAULIC CONTROL SYSTEM FOR AUTOMATIC TRANSMISSION

BACKGROUND OF THE INVENTION

1. Field of the Invention

The present invention relates to a hydraulic control system controlling hydraulic pressure that is supplied to hydraulic frictional engagement elements provided in an automatic transmission.

2. Discription of the Prior Art

An automatic transmission for a vehicle supplies hydraulic pressure to hydraulic frictional engagement elements such as clutches and brakes, and automatically performs change of gear ratio (gear speed) between an input shaft and an output shaft according to driving states of the vehicle by engaging desired rotating elements such as rotating drums and gears, by engaging or the rotating elements and fixed elements such as cases by means of these hydraulic frictional engagement elements.

In this automatic transmission, if increase of transmission torque of the hydraulic frictional engagement elements, that is, so-called engagement elements that change from released state to engaged state through upshift is improper, an uncomfortable shock is generated during the shifting.

For example, if increase of engaging capacity of the engagement elements during upshift is too rapid, torque at the time of start of an inertia phase after a torque phase is terminated rises rapidly as shown by an output shaft torque waveform of a broken line F in FIG. 9, and an uncomfortable shift shock is generated.

Moreover, if increase of the engaging capacity of the engagement elements during upshift is too gradual, both the torque phase and inertia phase are prolonged as shown by an output shaft torque waveform of a broken line G in FIG. 9, and an extraordinary long time is required till the upshift is finished. This causes not only an uncomfortable body feeling but also increase of heating amount of the hydraulic frictional engagement elements during the shifting, whereby durability is deteriorated.

An example of devices preventing such shift shock and slow feeling is described in Japanese Laid-Open Patent Publication No. 62-41460. This device makes change characteristic of hydraulic pressure that is supplied to the engagement elements proper and performs hydraulic control so that an output shaft torque reaches an adequate value for the inertia phase without thrust-up at the time of start of the inertia phase after the torque phase as shown by a solid line E in FIG. 9.

Moreover, if the increase of the engaging capacity of the engagement elements during the torque phase is further hastened, and the increase of the engaging capacity of the engagement elements at the time of start of the inertia phase is appropriately set, a decrease time (hereinafter referred to as a pull time) of torque of the torque phase is shortened.

If this pull time is made shorter than a predetermined time, torque reduction due to the torque phase cannot be completely transmitted to a drive system provided downstream from the automatic transmission in relation to frequency response of the drive system.

That is, if torque phase time is shortened as shown by an output shaft torque waveform of a solid line E in FIG. 10, shock generated in acceleration of the vehicle at the time of torque phase takes a form as annealed in response to change of the output shaft torque, like acceleration of the vehicle as shown by a thick line H in FIG. 10, and a pull-in shock due to the torque phase can be reduced.

Thus, by controlling timing of release or engagement of the engagement elements so that time of the torque phase is shortened while shock of the inertia phase of the output shaft torque as shown by the solid line E in FIG. 9 is maintained as it is, a comfortable shift feeling including a good accelerating feeling and reduced shift shock can be obtained.

However, in the conventional device, even if timing of engagement or release of the brakes and clutches is controlled so that the output shaft torque waveform as shown by the solid line E in FIG. 10 is established in order to obtain a comfortable shift feeling, characteristics of hydraulic pressure, $\mu$ characteristics of friction material used for the engagement elements, dispersion of engine torque and the like complicates the stable realization of the comfortable shift feeling.

For example, if the characteristics of hydraulic pressure is low, $\mu$ is low, or the engine torque is large, that is, dispersion occurs in the direction where transmission torque of the engagement elements is small compared to the input torque, the torque phase does not readily proceed, and therefore the pull time of the torque phase cannot be shortened.

Moreover, if the characteristics of hydraulic pressure is high, $\mu$ is high, or the engine torque is small, that is, dispersion occurs in the direction where the transmission torque of the engagement elements is large compared to the input torque, the inertia phase proceeds at an engagement capacity wherein termination of the torque phase is supposed. Since it is aimed to raise the capacity at a dash till the termination of the torque phase, if the inertia phase starts at such a rising gradient, a great shock occurs at the time of start of the inertia phase as shown by a broken line F in FIG. 9.

If rise of hydraulic pressure during the torque phase is not made extraordinarily rapid, the above effect (pull shock of the torque phase can be reduced) cannot be obtained. Actually, unless a command value of hydraulic pressure that is commanded to a hydraulic control system is set to a value by which hydraulic pressure is rapidly raised after a piston stroke of the engagement elements is terminated, and hydraulic pressure is quickly raised to a maximum, the above-described shock cannot be realized.

Considering responsibility and stability until transition to the torque phase after a piston stroke time and a piston stroke are terminated, it is necessary to set a hydraulic pressure command value approximately to a hydraulic pressure by which the inertia phase is started while the engagement elements are stroked by piston, and to raise the hydraulic pressure stepwise from immediately after termination of the piston stroke.

Therefore, it is necessary to appropriately command a so-called piston stroke control command pressure that is a hydraulic pressure value fully progressing the piston stroke to a hydraulic control unit so as to meet the above purpose. However, when dispersion factor (friction coefficient of friction material of the engagement elements or hydraulic pressure) that has influence on the transmission torque of the engagement elements disperses in a wide range, or when dispersion factor (engine torque) that has influence on the input torque disperses in a narrow range, since hydraulic pressure rises stepwise, compared to the case when hydraulic pressure rises gently, a rapid thrust-up shock that is caused because the output shaft torque rises more rapidly than aimed at the time of start of the inertia phase is remarkably apt to occur. For this reason, it is extremely difficult to set the piston stroke control command pressure that fully exerts effect that restrains generation of such a thrust-up shock and simultaneously shortens torque phase time.

SUMMARY OF THE INVENTION

The present invention has been made in view of the aforementioned problem, and it is therefore an object of the present invention to provide a hydraulic control system for an automatic transmission, which is, at the time of an upshift capable of certainly realizing a short torque phase time of the extent to which no thrust-up shock in an inertia phase is generated and fluctuation of acceleration of a vehicle is not almost felt during a torque phase.

The present invention provides a hydraulic control system for an automatic transmission, comprising an input shaft that is driven by a rotational power of an engine, an output shaft outputting a rotational power to a drive wheel of a vehicle, an engagement element changing to engagement by hydraulic pressure supplied by a hydraulic control unit and performing a change to a high speed gear from a low speed gear, an electronic control unit commanding a hydraulic pressure value of hydraulic pressure that is supplied to the engagement element to the hydraulic control unit, and a gear ratio detecting unit detecting an inertia phase from a gear ratio that is a speed ratio between the input shaft and the output shaft, and detecting a gear ratio at the time of the inertia phase, wherein the electronic control unit commands a hydraulic pressure for advancing a torque phase as an engagement command pressure to the engagement element until a start of the inertia phase is detected, and corrects the engagement command pressure on the basis of a gear ratio that is detected by the gear ratio detecting unit.

A rate of change of a gear ratio immediately after the inertia phase start has a very large correlation with shift shock to the initial stage of the inertia phase from the final stage of the torque phase.

This is because magnitude of inertia energy of an input side that is released to an output shaft torque is proportional to a rate of change of input rotation, and the rate of change of the gear ratio is proportional to the rate of change of the input rotation at the time of the inertia phase.

That is, at the time of the inertia phase, as the rate of change of the gear ratio is large, the rise amount of the output shaft torque is increased, and as the rate of change of the gear ratio is small, the rise amount of the output shaft torque is reduced.

For example, as shown by the solid line G in FIG. 9, rise of torque to inertia phase torque is delayed when the torque phase is terminated and the inertia phase is started, and the rate of change of the gear ratio at the initial stage of the inertia phase is reduced when the pull-in time of torque of the torque phase is long.

On the contrary, as shown in the broken line F in FIG. 9, the rate of change of the gear ratio of the initial stage of the inertia phase is increased if thrust-up shock is large when the inertia phase is started.

In the present invention, the piston stroke control command pressure, which is set to shorten the torque phase time on the basis of the rate of change of the gear ratio immediately after the inertia phase start that accurately represents condition of the output shaft torque in a period from the torque phase to the inertia phase, and which determines a shock of the initial stage of the inertia phase, is corrected.

Therefore, the engaging capacity of an engagement side till the inertia phase start and immediately after the inertia phase start can be appropriately set, even in an automatic transmission having dispersion in hydraulic characteristics or μ characteristics of friction materials that are used in the engagement elements or in an vehicle having dispersion in engine torque.

And there can be obtained a desired output shaft torque wave form not having problem such as an uncomfortable shift shock due to a rapid rise of torque at the inertia phase start which occurs because rise of the engaging capacity of the engagement elements is too rapid during an upshift, as shown by an output shaft torque wave form of the broken line F in FIG. 9, or shift shock wherein both the torque phase and the inertia phase are prolonged and a long time is required till an upshift is terminated, which occurs because the rise of the engaging capacity of the engagement elements is too gentle during the upshift, as shown by the output shaft torque wave form of the broken line G in FIG. 9.

Thereby, there can be realized shift of a comfortable feeling in which reduction of output shaft torque has not a strong influence on acceleration of the vehicle at the time of the torque phase during upshift.

The above and further objects and features of the invention will be more fully apparent from the following description when the same is considered with reference to the accompanying drawings.

BRIEF DESCRIPTION OF THE DRAWINGS

FIG. 2 is a table showing a relation between gear speed position of an automatic transmission and engagement elements.

DETAILED DESCRIPTION OF THE PREFERRED EMBODIMENT

A preferred embodiment of the present invention will be described hereinbelow.

Figure 1:
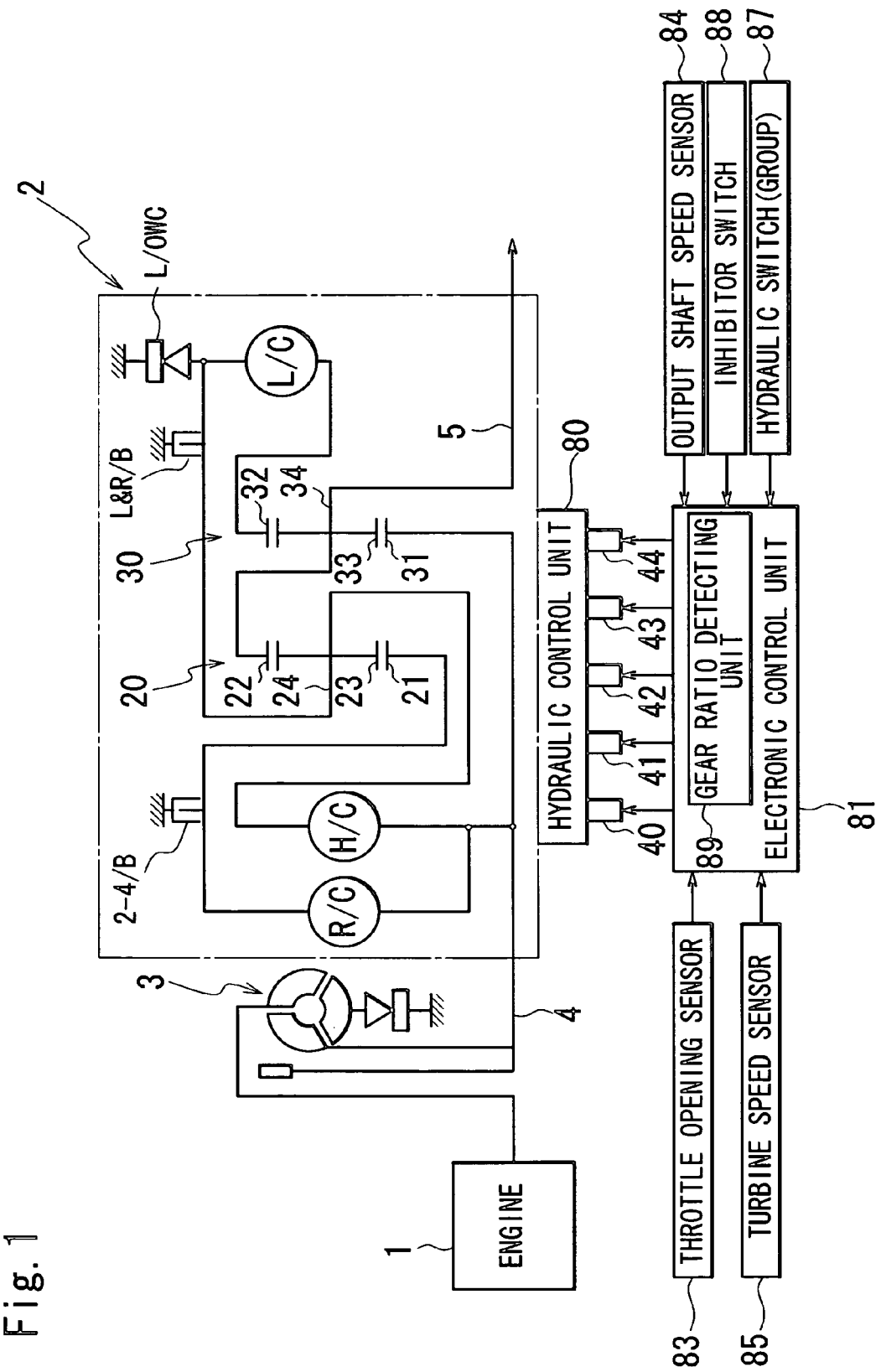
FIG. 1 is a view showing an embodiment of the present invention.

FIG. 1 is a view showing a construction of an automatic transmission to which the present invention is applied.

An engine 1 is connected to an automatic transmission 2 through a torque converter 3.

The output of engine 1 is regulated by the throttle valve which is associated with an accelerator pedal operated by the driver, and which increases opening from a full close state to a full open state according to the accelerator pedal depression.

And output rotation of the engine 1 is inputted to an input shaft 4 of the automatic transmission 2 through the torque converter 3.

In the automatic transmission 2, a front planetary gear set 20 and a rear planetary gear set 30 are disposed in this order from the side of the engine 1 on the input shaft 4 and an output shaft 5 which are arranged on the same axis.

The front planetary gear set 20 disposed near the engine 1 is comprised of a front sun gear 21, a front ring gear 22, a front pinion 23 engaging with these gears and a front carrier 24 supporting the front pinion 23 rotatably.

The rear planetary gear set 30 disposed far from the engine 1 is comprised of a rear sun gear 31, a rear ring gear 32, a rear pinion gear 33 engaging with these gears and a rear carrier 34 supporting the rear pinion gear 33 rotatably.

As engagement elements determining a power transmission path (gear speed position) in the automatic transmission 2, there are a low clutch L/C, a 2-4 speed brake 2-4/B, a high clutch H/C, a low and reverse brake L&R/B, a low one-way clutch L/OWC and a reverse clutch R/C, and each engagement element is provided in correlation with components of both the planetary gear sets 20, 30 as follows.

The front sun gear 21 can be selectively connected to the input shaft 4 by means of the reverse clutch R/C and fixed to a case of the automatic transmission 2 by means of the 2-4 speed brake 2-4/B.

The front carrier 24 can be selectively connected to the input shaft 4 by means of the high clutch H/C. Moreover, the front carrier 24 is prevented from rotating in a direction opposite to rotation of the engine 1 by the low one-way clutch L/OWC and can be selectively fixed to the case of the automatic transmission 2 by means of the low and reverse brake L&R/B.

The front carrier 24 and the rear ring gear 32 can be selectively connected to each other by the low clutch L/C.

The front ring gear 22 and the rear carrier 34 are connected to each other, the front ring gear 22 and the rear carrier 34 is connected to the output shaft 5, and the rear sun gear 31 is connected to the input shaft 4.

Figure 2:
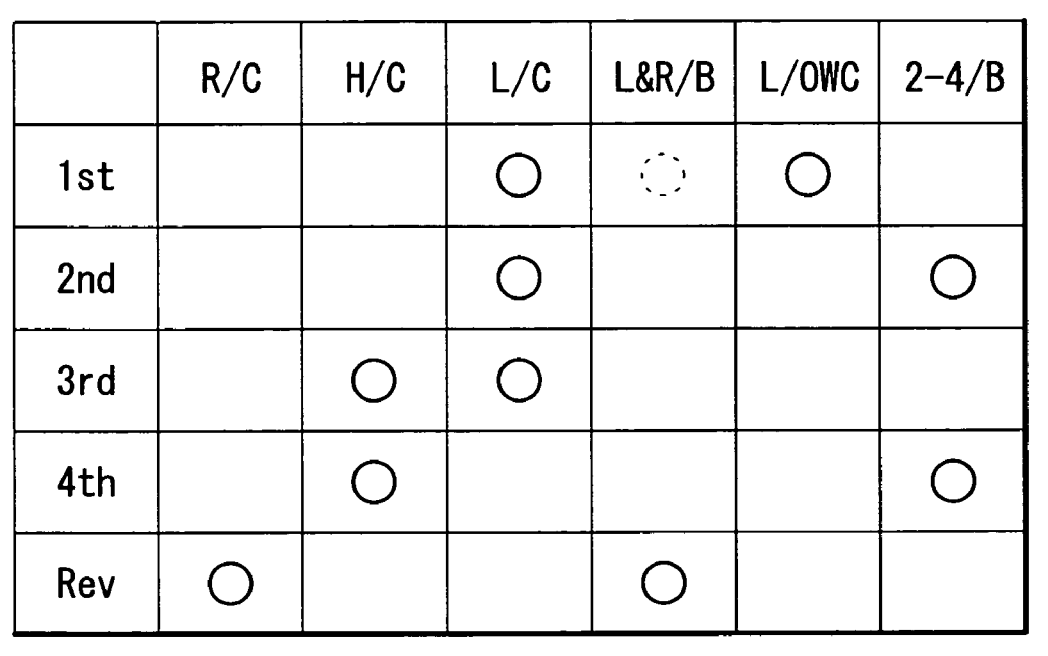

The automatic transmission 2 achieves gear speed positions of four forward speeds and a reverse speed by a selective connection of the engagement elements L/C, 2-4/B, H/C, L&R/C and R/C shown by solid line circles in FIG. 2 and a self engagement of the low one-way clutch L/OWC as shown by solid line circles in FIG. 2.

The first forward speed (1st) is achieved by engaging the low clutch L/C and the low one-way clutch L/OWC as shown by the solid line circles.

In addition, the low and reverse brake L&R/B shown by the broken line circle is engaged when engine brake is required.

A second forward speed (2nd) is achieved by engaging the low clutch L/C and the 2-4 speed brake 2-4/B as shown by the solid line circles, and a third forward speed (3rd) is achieved by engaging the high clutch H/C and the low clutch L/C.

The fourth forward speed (4th) is achieved by engaging the high clutch H/C and the 2-4 speed brake 2-4/B as shown by the sold line circles, and a reverse speed (Rev) is achieved by engaging the reverse clutch R/C and the low and reverse brake L&R/B.

Engagement and release of the engagement elements L/C, 2-4/B, H/C, L&R/C and R/C shown in FIG. 2 are established by a hydraulic pressure control unit 80 shown in FIG. 1, and a line pressure solenoid 40, a low clutch solenoid 41, a 2-4 speed brake solenoid 42, a high clutch solenoid 43 and a low and reverse brake solenoid 44 are disposed in the hydraulic pressure control unit 80 in addition to a not-shown manual valve.

The line pressure solenoid 40 changes a line pressure as a base pressure of the shift control between high and low levels by its on and off operation, and the not-shown manual valve is operated by the driver among a forward drive range position (D), a reverse drive range position (R) and park and stop range positions (P, N) according to a desired running mode.

In D range, the manual valve supplies the line pressure to a predetermined circuit, so as to individually control operating fluid pressure supplied to a corresponding one of the low clutch L/C, the 2-4 speed brake 2-4/B, the high clutch H/C and the low and reverse brake L&R/B by duty control of the low clutch solenoid 41, the 2-4 speed brake solenoid 42, the high clutch solenoid 43 and the low and reverse brake solenoid 44 using the line pressure as the base pressure.

Therefore the gear speeds of the first to fourth forward speeds shown in FIG. 2 are achieved by the duty control of respective solenoids.

In R range, the manual valve supplies the line pressure directly to the reverse clutch R/C independently from the duty control of the above respective solenoids, supplies duty control pressure by the low and reverse brake solenoid 44 to the low and reverse brake L&R/B and reverse speed position shown in FIG. 2 is achieved by engaging them.

In P and N ranges, the manual valve supplies the line pressure to none of the circuits and puts the automatic transmission in a neutral state by releasing all engagement.

The respective solenoids 40, 41, 42, 43 and 44 disposed in the hydraulic control unit 80 are controlled by an electronic control unit 81.

The electronic control unit 81 receives a signal from a throttle opening sensor 83 detecting a throttle opening of the engine 1, a signal from a turbine speed sensor 85 detecting turbine speed that is output speed of the torque converter 3 (transmission input speed), a signal from an output shaft speed sensor 84 detecting speed of the output shaft 5 of the automatic transmission 2 and a signal from an inhibitor switch 88 detecting a selected range.

Moreover, the electronic control unit 81 receives a signal from hydraulic switches (group) 87 which are respectively arranged in an engagement element to be engaged during shift, that is, the 2-4 speed brake 2-4/B during shift from the first forward speed to the second forward speed, the high clutch H/C during shift from the second forward speed to the third forward speed and the 2-4 speed brake 2-4/B during shift from the third forward speed to the fourth forward speed, as seen from FIG. 2.

Here, the hydraulic switches (group) 87 are turned ON when the operating fluid pressure of a corresponding engagement element becomes a pressure which terminates a loss stroke of the engagement element and starts to generate an engagement capacity.

The electronic control unit 81 includes a gear ratio detecting unit 89, and the gear ratio detecting unit 89 calculates a gear ratio that is a ratio of speed of the input shaft and the output shaft from the turbine speed of the torque converter detected by the turbine speed sensor 85 and the speed of the output shaft 5 detected by the output shaft speed sensor 84.

Next, there will be explained a flow of calculation of an engagement command pressure which the electronic control unit 81 outputs to the solenoids controlling the engagement elements which change from released state to engaged state in response to an upshift command.

In this embodiment, there will be explained an engagement command pressure which is commanded to the 2-4 speed brake solenoid 42 controlling the 2-4 speed brake 2-4/B which changes from released state to engaged state during shift from the first forward speed to the second forward speed.

Figure 3:
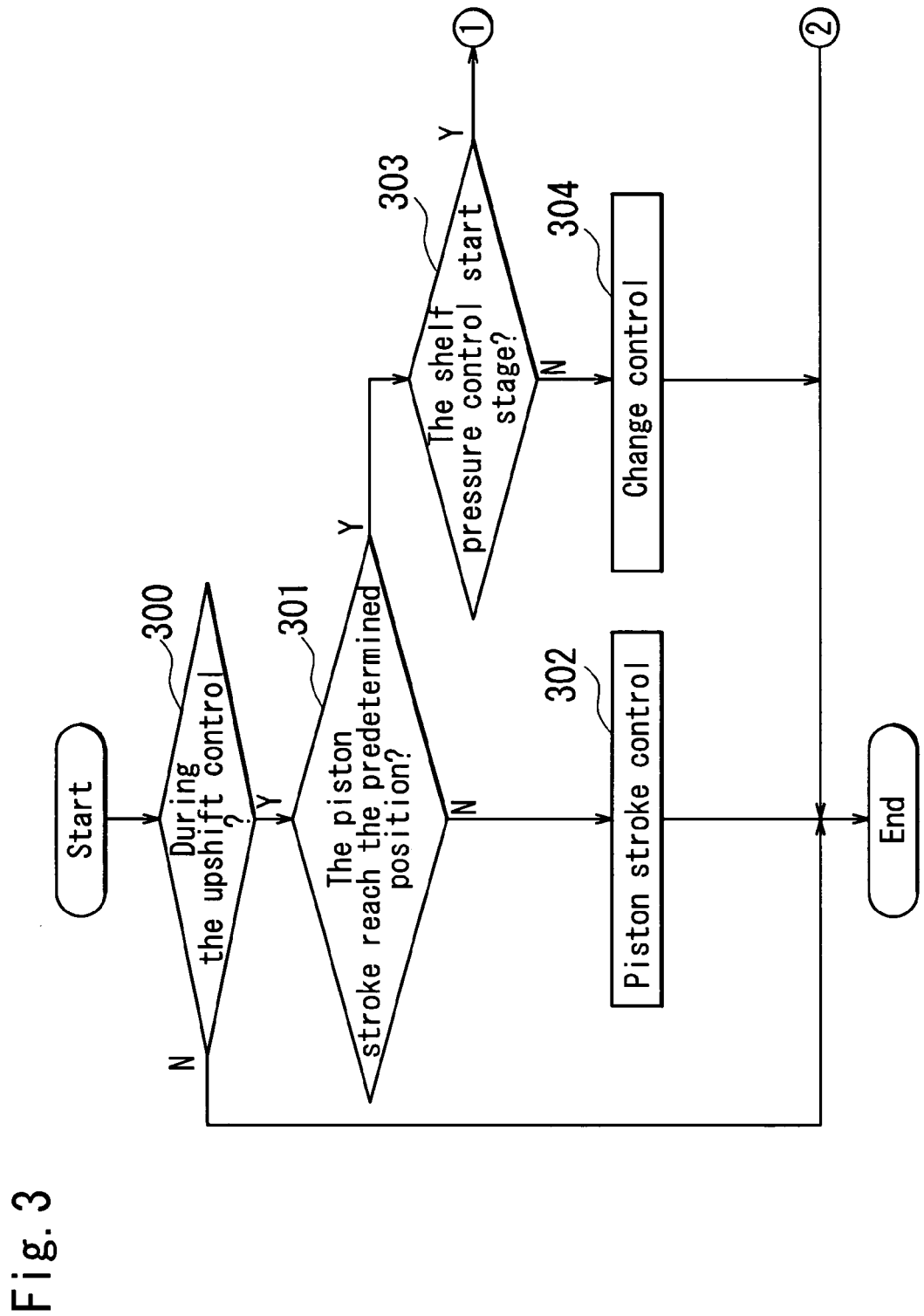
FIG. 3 is a flow chart showing engagement command pressure calculation process.
Figure 4:
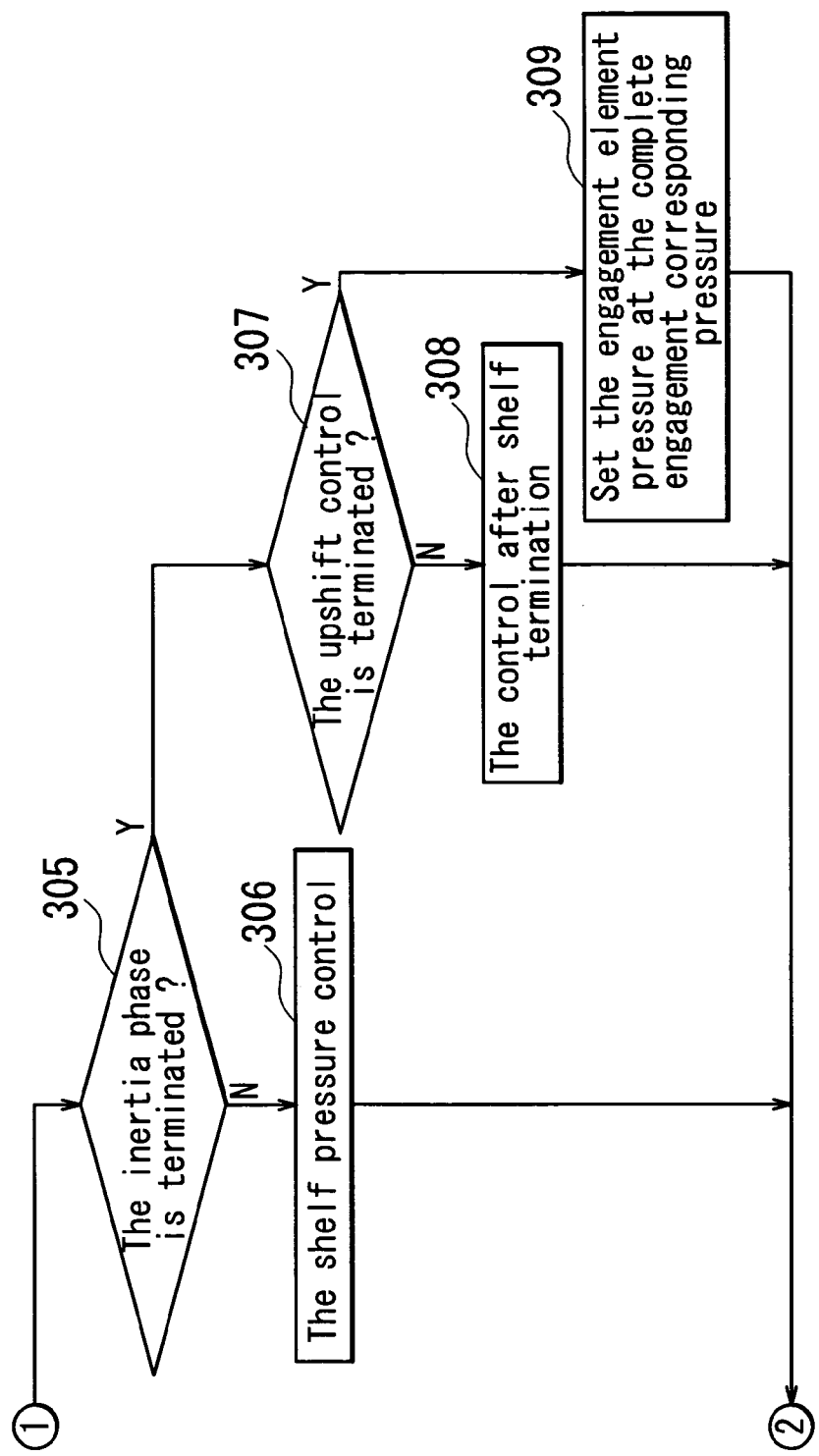
FIG. 4 is a flow chart showing engagement command pressure calculation process.
Figure 5:
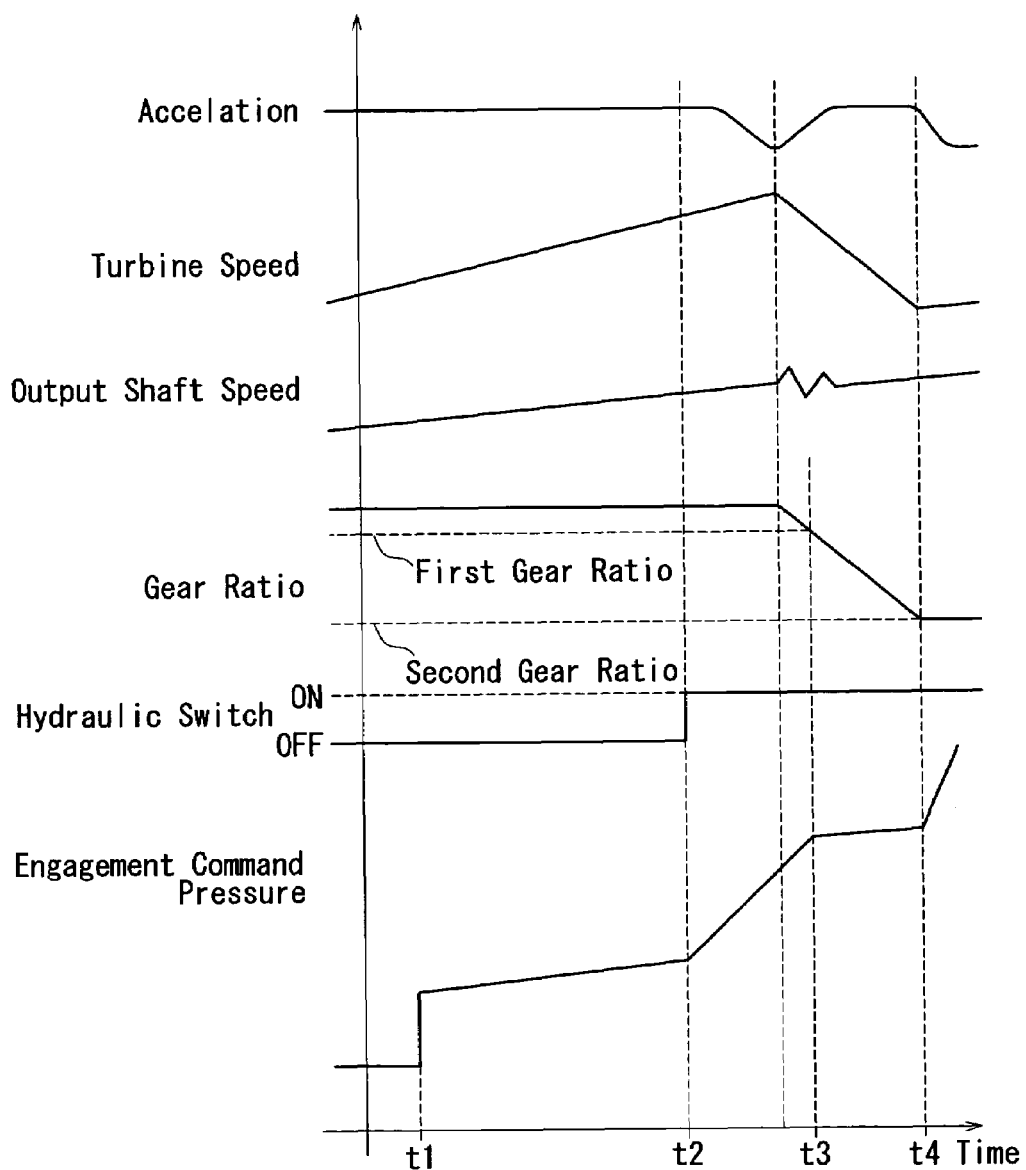
FIG. 5 is a time chart showing a change of engagement command pressure.

FIGS. 3 and 4 show a flow of engagement command pressure calculation process which is performed by the electronic control unit 81, and FIG. 5 is a time chart showing a change of the engagement command pressure.

Control shown in this time chart is performed per a set predetermined time (for example, per 10 m/sec).

In a step 300, the electronic control unit 81 determines whether a shift control (upshift control) from a low speed gear to a high speed gear (for example, from the first speed to the second speed) is performed by changing the 2-4 speed brake 2-4/B from a released state to an engaged state, based on a determination that a target gear speed is higher than a current gear speed from a throttle opening and a vehicle speed (for example, when the current gear speed is a first speed though the target gear speed is a second speed).

In the step 300, if the upshift control is not performed, this process is finished.

On the other hand, if it is determined that the upshift control is being performed, the routine proceeds to a step 301 to determine whether a piston biasing a friction disc of the 2-4 speed brake 2-4/B reaches a predetermined position.

If oil is supplied to the 2-4 speed brake 2-4/B to which the oil has not been supplied, hydraulic pressure that is supplied to the 2-4 speed brake 2-4/B while the piston of the 2-4 speed brake 2-4/B strokes becomes a value corresponding to an area wherein the piston receives supplied hydraulic pressure and a pressing force of a return spring pushing the piston back in a release side direction of the 2-4 speed brake 2-4/B.

Therefore, from the fact that the hydraulic pressure that is supplied to the 2-4 speed brake 2-4/B exceeds a predetermined value, it can be presumed that the piston of the 2-4 speed brake 2-4/B reaches the predetermined position.

Based on this principle, it is determined that the piston of the 2-4 speed brake 2-4/B has reached the predetermined position when an engagement element pressure that is supplied to the 2-4 speed brake 2-4/B from the 2-4 speed brake solenoid 42 exceeds a predetermined value in the process of a after-mentioned step 302, and the hydraulic switches 87 detecting hydraulic pressure supplied to the 2-4 speed brake 2-4/B was turned ON (time t2 in FIG. 5).

The routine proceeds to a step 303 if it is determined that the piston has reached the predetermined position, and the routine proceeds to the step 302 if it is determined that the piston has not reached the predetermined position.

Since the hydraulic pressure is not supplied to the 2-4 speed brake 2-4/B immediately after the upshift control is started, the piston does not reach the predetermined position. Therefore, the decision of the step 301 is "NO" at the time of the upshift start, and the routine proceeds to the step 302.

In the step 302, a piston stroke control of the engagement command pressure is performed.

Calculation of the engagement command pressure in the piston stroke control is performed by the following equation.

$$\text{Engagement command pressure} = \text{piston stroke control initial pressure} + \text{engagement side learning pressure} + \text{piston stroke control gradient} \times \text{piston stroke control elapsed time} \quad (1)$$

Here, the piston stroke control initial pressure and the piston stroke control gradient are set at predetermined values. The engagement side learning pressure will be later described.

Thereby, as shown in FIG. 5, on and after a time t1 a hydraulic pressure which increases together with an elapsed time from start of a piston stroke control is commanded as an engagement command pressure to the 2-4 speed brake solenoid 42.

In addition, the engagement command pressure during the period from the time t1 to an after-mentioned time t2 corresponds to a so-called piston stroke control command pressure that is a hydraulic pressure value for fully advancing piston stroke.

This process flow is terminated after command of the engagement command pressure in the step 302, and next process flow starting from the step 300 is performed again, after an above-mentioned set predetermined time elapses.

Then, until it is determined that piston stroke reaches a predetermined position in the step 301, piston stroke control is performed per a predetermined time.

If the piston of the 2-4 speed brake 2-4/B is moved by the piston stroke control and it is determined that the piston reaches the predetermined position, determination of "YES" is made in the step 301, and the routine proceeds to a step 303.

In the step 303, it is determined whether a shelf pressure control start stage is started, and while the start stage is not started, a change control of the engagement command pressure is performed in a step 304.

Calculation of the engagement command pressure in the change control of the step 304 is performed by the following equation.

$$\text{Engagement command pressure} = \text{change control initial pressure} + \text{change control gradient} \times \text{change control elapsed time} \quad (2)$$

Here, the change control gradient is set at a predetermined value, and the change control initial pressure is set at the engagement command pressure at the time of a piston stroke control termination (time t2).

Thereby, as shown in FIG. 5, a hydraulic pressure value which increases together with an elapsed time from a change control started is commanded as engagement command pressure to the 2-4 speed brake solenoid 42 at a rise gradient with a sharper inclination than a gradient of a command pressure at the time of the piston stroke control, on and after a time t2.

In addition, the engagement command pressure from the time t2 to an after-mentioned time t3 corresponds to a so-called torque phase advance command pressure that is a hydraulic pressure value for advancing the torque phase.

After command of the engagement command pressure in the step 304, this process flow is terminated. Then, the change control is continued until it is determined that the shelf pressure control start stage is started in the step 303 of the next process flow.

In the determination of the shelf pressure control start stage performed in the step 303, it is determined that the shelf pressure control start stage (time t3 in FIG. 5) is started when a gear ratio that is calculated by the gear ratio detecting unit 89 is less than a first gear ratio that is previously set.

When it is determined that the shelf pressure control start stage is started, the routine proceeds to a step 305.

In the step 305, it is determined whether the inertia phase is terminated, and while the inertia phase is not terminated, a shelf pressure control of the engagement command pressure is performed in a step 306.

Calculation of the engagement command pressure in the shelf pressure control of the step 306 is performed by the following equation.

Engagement command pressure=shelf initial pressure+shelf pressure gradient×shelf pressure control elapsed time (3)

Here, the shelf initial pressure and the shelf pressure gradient are set at predetermined values.

Thereby, as shown in FIG. 5, on and after the time t3 a hydraulic pressure increasing together with an elapsed time from start of the shelf pressure control is commanded as an engagement command pressure to the 2-4 speed brake solenoid 42. A rise gradient of the engagement command pressure is gentler than a gradient of the engagement command pressure at the time of the change control.

After command of the engagement command pressure in the step 306, this process flow is terminated.

Then, the shelf pressure control is continued until time t4 in FIG. 5 when termination of the inertia phase is determined in the step 305 of later flow.

The termination (time t4 in FIG. 5) of the inertia phase is determined in the step 305 when a gear ratio calculated by the gear ratio detecting unit 89 is less than a second gear ratio that is previously set.

When it is determined that the inertia phase is terminated, the routine proceeds to a step 307.

In the step 307, it is determined whether the upshift control is terminated and when the upshift control is not terminated, a control after shelf termination of the engagement command pressure is performed in a step 308.

Calculation of an engagement command pressure in the control after shelf termination of the step 308 is performed by the following equation.

Engagement command pressure=hydraulic pressure at the time of shelf termination+control gradient after shelf termination×control elapsed time after shelf termination (4)

Here, the hydraulic pressure at the time of shelf termination and the control gradient after shelf termination are set at predetermined values.

Thereby, as shown in FIG. 5, a hydraulic pressure value for maintaining an engagement state of the 2-4 speed brake 2-4/B is commanded as an engagement command pressure to the 2-4 speed brake solenoid 42 on and after the time 4.

In addition, the engagement command pressure in the control after shelf termination is increased to a predetermined maximum command pressure at a gradient that is calculated by the equation (4), and then the predetermined maximum command pressure is maintained as the engagement command pressure.

After the engagement command pressure is commanded in the step 308, this process flow is terminated.

Then, the control after shelf termination of the step 308 is continued until termination of the upshift control is determined in the step 307 of the next process flow.

Determination of the termination of the upshift control in the step 307 is made when it is judged that the shift can be terminated on the basis of a progress of the shift, condition of hydraulic pressure or the like.

This process flow is terminated after a complete engagement corresponding pressure for maintaining gear speed position after the termination of the upshift is commanded to the engagement elements in a step 309 when the termination of the upshift control is determined.

Next, correction of the engagement side learning pressure that is used when the engagement command pressure is calculated in the above-mentioned piston stroke control (step 302) will be explained.

Figure 6:
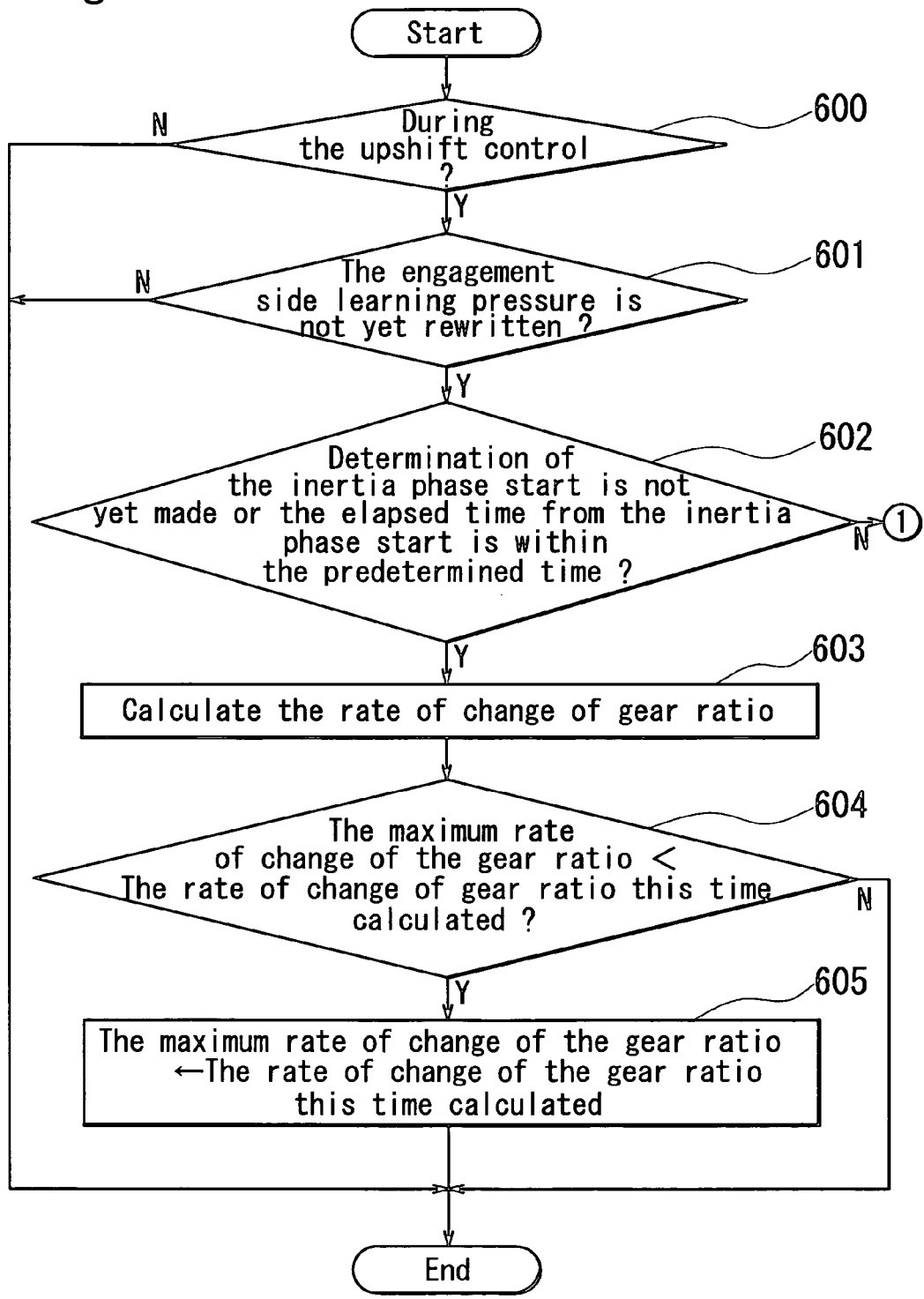
FIG. 6 is a flow chart showing engagement side learning pressure correction.
Figure 7:
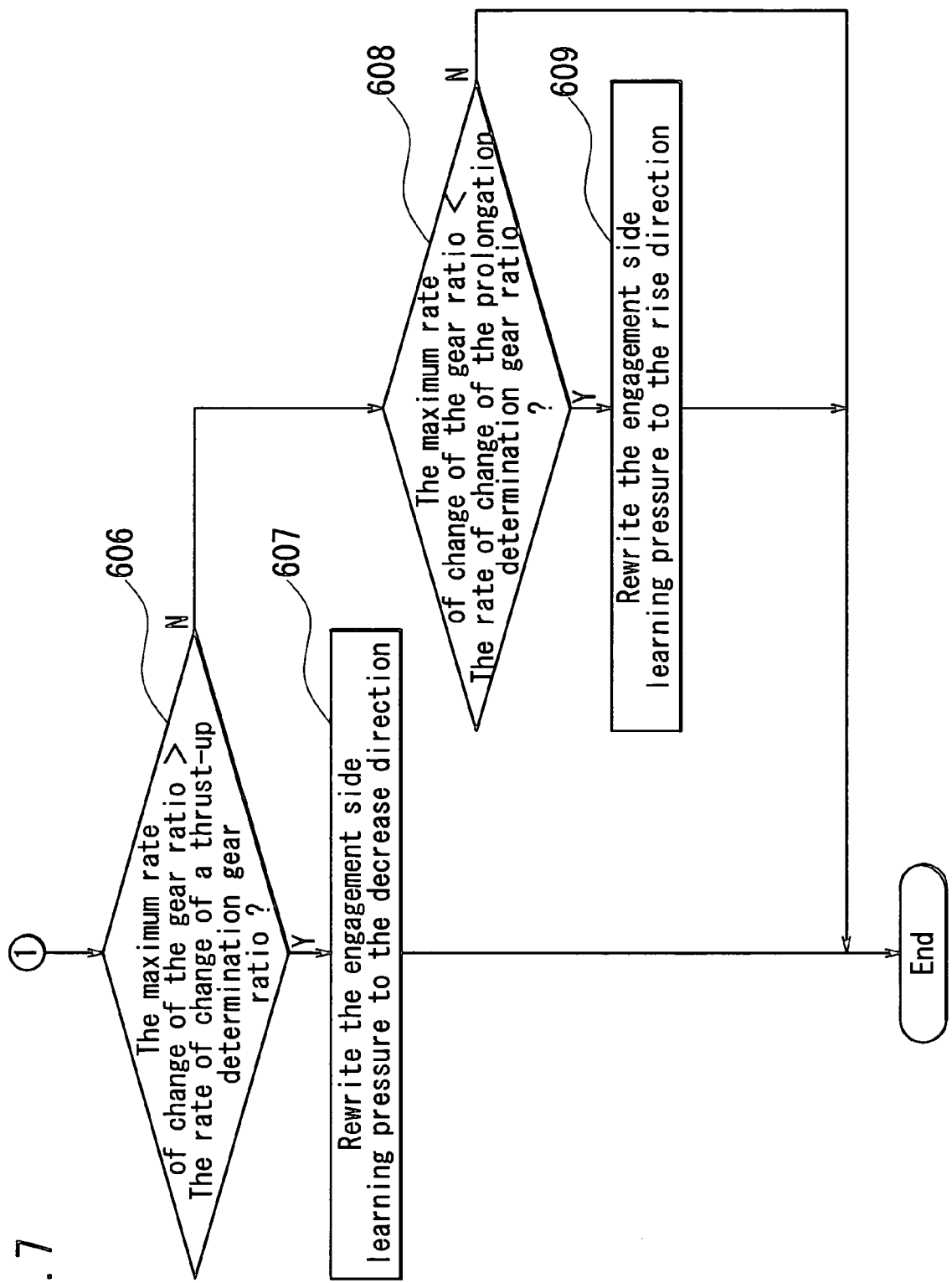
FIG. 7 is a flow chart showing engagement side learning pressure correction.

FIGS. 6 and 7 show a flow of correction control of the engagement side learning pressure.

The control shown in this flow chart is performed per a set time (for example, per 10 msec).

In a step 600, the electronic control unit 81 determines whether shift control (upshift) changing from a low speed gear to a high speed gear (for example, from the first speed to the second speed) is performed by changing the 2-4 speed brake 2-4/B from the released state to the engaged state, based on a determination that a target gear speed is higher than a current gear speed on the basis of a throttle opening, vehicle speed or the like (for example, when the current gear speed is the first speed although the target gear speed is the second speed).

When it is determined that the upshift control is not being performed, this process flow is terminated, and when it is determined that the upshift control is being performed, the routine proceeds to a step 601.

In the step 601, It is determined whether the engagement side learning pressure is already rewritten in after-mentioned steps 607, 609. When the engagement side learning pressure was rewritten, this process flow is terminated, and when the engagement side learning pressure was not rewritten, the routine proceeds to a step 602.

In the step 602, it is determined whether determination of the inertia phase start is not yet made, or whether an elapsed time from the inertia phase start is within a predetermined time. Here, the electronic control unit 81 determines that inertia phase is started when it detects that the gear ratio is reduced compared to a gear ratio before shift.

When determination of the inertia phase start is not made or an elapsed time from the inertia phase start is within a predetermined time, the routine proceeds to a step 603, and if not so, the routine proceeds to a step 606.

In the step 603, a rate of change of gear ratio is calculated from a gear ratio before a predetermined time and a gear ratio at a current time point which are respectively calculated by the gear ratio detecting unit 89.

In a step 604, a maximum rate of change of a gear ratio that is set in the previous process flow is compared with a rate of change of gear ratio that is calculated this time. When the rate of change of the gear ratio calculated this time is larger than the maximum rate of change of the gear ratio set previous time, in a step 605, the rate of change of the gear ratio calculated this time is set in place of previous maximum rate of change of the gear ratio.

Moreover, in the step 604, when the rate of change of the gear ratio calculated this time is less than the maximum rate of change of the gear ratio, this process flow is terminated.

When it is determined that the predetermined time is already elapsed from the inertia phase start in the step 602, it is determined in the step 606 whether the maximum rate of change of the gear ratio is larger than a rate of change of a thrust-up determination gear ratio.

In addition, the rate of change of the thrust-up determination gear ratio is a determined value indicating a rapid change of gear ratio that generates a thrust-up shock in the vehicle. The maximum rate of change of the gear ratio is a maximum value of rate of change of gear ratio calculated in the step 603 from this upshift control start till it is determined that the predetermined time is elapsed from the inertia phase start in the step 602. (the maximum rate of change of the gear ratio is set in the step 605).

If it is determined that the maximum rate of change of the gear ratio is larger than the rate of change of the thrust-up determination gear ratio, it is judged that gear ratio is rapidly changed and the thrust-up shock is generated in the vehicle, and the engagement side learning pressure is rewritten to the decrease direction in the step 607.

Figure 8:
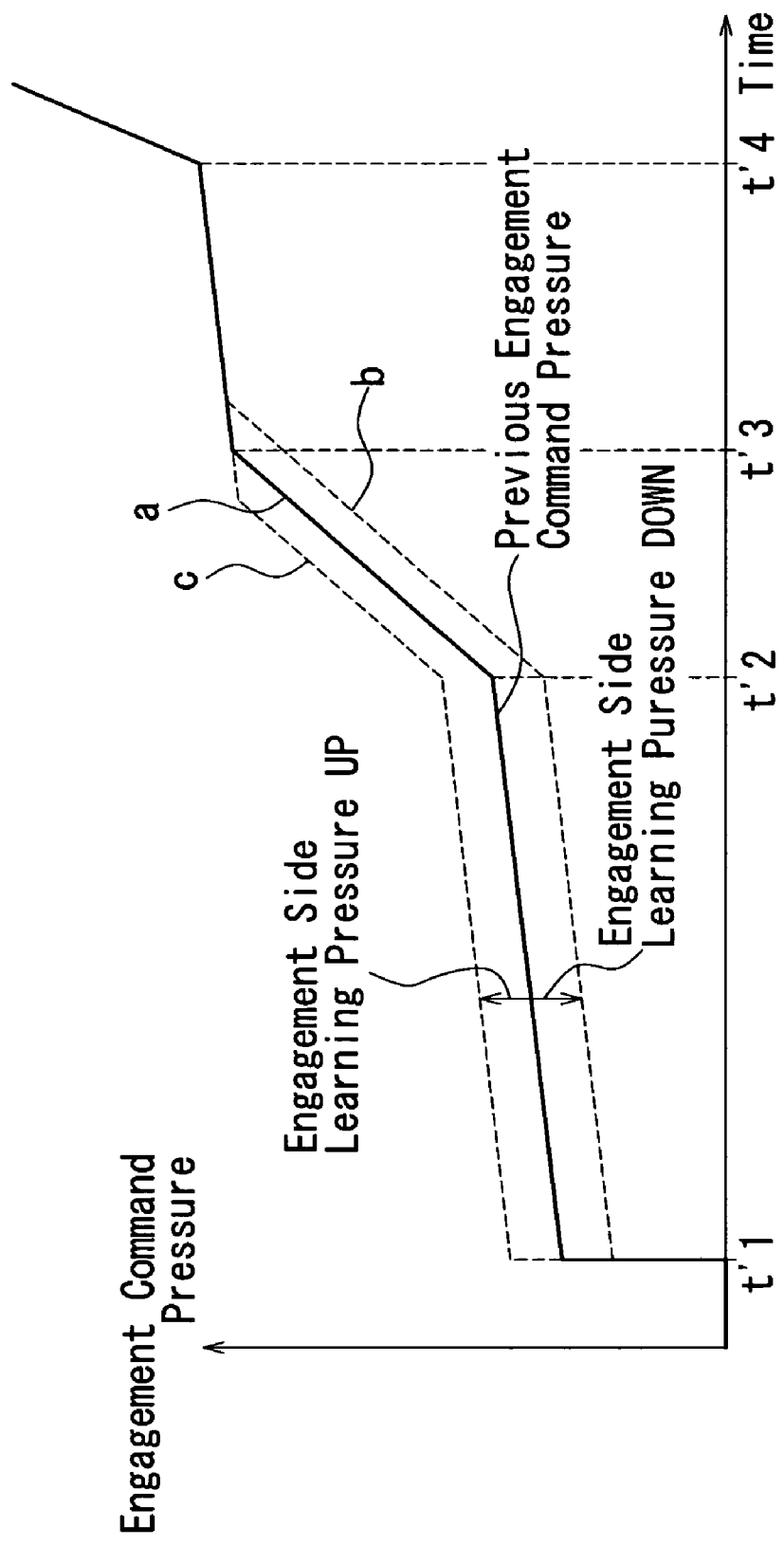
FIG. 8 is a time chart showing engagement command pressure at the time of correcting the engagement side learning pressure.

Thereby, in a next shift, an engagement command pressure b that is smaller than an engagement command pressure a that is set in the previous upshift control of the same condition is commanded to the 2-4 speed brake solenoid 42 at the time of the piston stroke control (time t'1 to time t'2), as shown in FIG. 8.

Moreover, the engagement command pressure at the time of the change control (time t'2 to time t'3) is also reduced together with reduction of the engagement command pressure at the time of the piston stroke control, a time to reach the shelf pressure becomes long, and rise gradient of hydraulic pressure provided to engagement element after the piston stroke termination becomes gentle.

After the engagement side learning pressure is rewritten, this process flow is terminated.

Until determination of "NO" is made in the step 601 and the upshift control is terminated, a subsequent process is not performed, and the process flow is terminated.

On the other hand, if it is determined that the maximum rate of change of the gear ratio is equal to or less than the rate of change of the thrust-up determination gear ratio in the step 606, it is determined whether the maximum rate of change of the gear ratio is smaller than a rate of change of a prolongation determination gear ratio in the step of the 608.

The rate of change of the prolongation determination gear ratio is set at a predetermined value indicating a gradual change of gear ratio.

If it is determined that the maximum rate of change of the gear ratio is smaller than the rate of change of the prolongation determination gear ratio, it is judged that a long time is required in the torque phase, the rise gradient of the output shaft torque at the time of the inertia phase start is gentle and accordingly a pull time due to the torque phase becomes long, and in the step 609 the engagement side learning pressure is rewritten to the rise direction.

Thereby, in the next shift, an engagement command pressure c that is larger than an engagement command pressure which is set in the previous upshift control under the same condition is commanded to the 2-4 speed brake solenoid 42 at the time of the piston stroke control (time t'1 to t'2) as shown in FIG. 8.

Moreover, the engagement command pressure at the time of the change control (time t'2 to t'3) is also increased together with the rise of the engagement command pressure at the time of the piston stroke control, a time till the engagement command pressure rises to the shelf pressure becomes short, and at the same time a hydraulic pressure rise gradient of the engagement command pressure after the piston stroke termination becomes also steep.

After the engagement side learning pressure is rewritten, this process flow is terminated.

Figure 9:
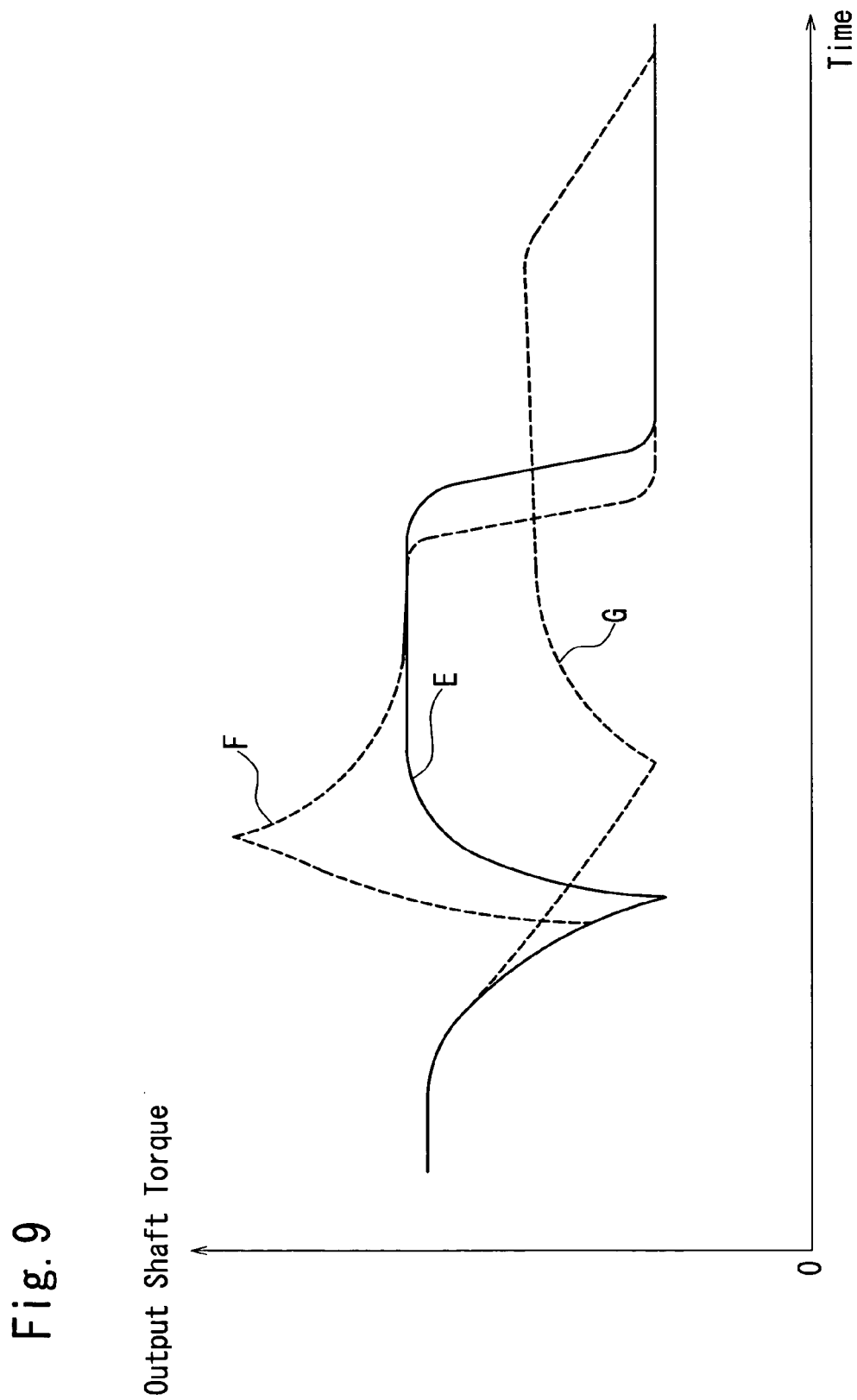
FIG. 9 is a time chart showing output shaft torque.

At the time when determination of the step 602 is "NO", if it is not determined that the maximum rate of change of the gear ratio that is calculated in the step 605 in the previous process flow is larger than the thrust-up determination gear ratio in the step 606, and it is not determined that this maximum rate of change of the gear ratio is smaller than the prolongation determination gear ratio in the step 608, it is determined that a current shock is a proper shock as shown by the sold line E in FIG. 9, and the process flow is terminated without performing the rewriting of the learning pressure.

This embodiment is thus constructed, and it is avoided that the output shaft torque rises rapidly as shown by the broken line F in FIG. 9 by correcting the engagement side learning pressure in the decrease direction when the maximum rate of change of the gear ratio is larger than the rate of change of the thrust-up determination gear ratio. Moreover, it is avoided that the output shaft torque is reduced and rise of torque requires a long time as shown by the broken line G in FIG. 9 by correcting the engagement side learning pressure in the rise direction when the maximum rate of change of the gear ratio is smaller than the rate of change of the prolongation determination gear ratio.

Figure 10:
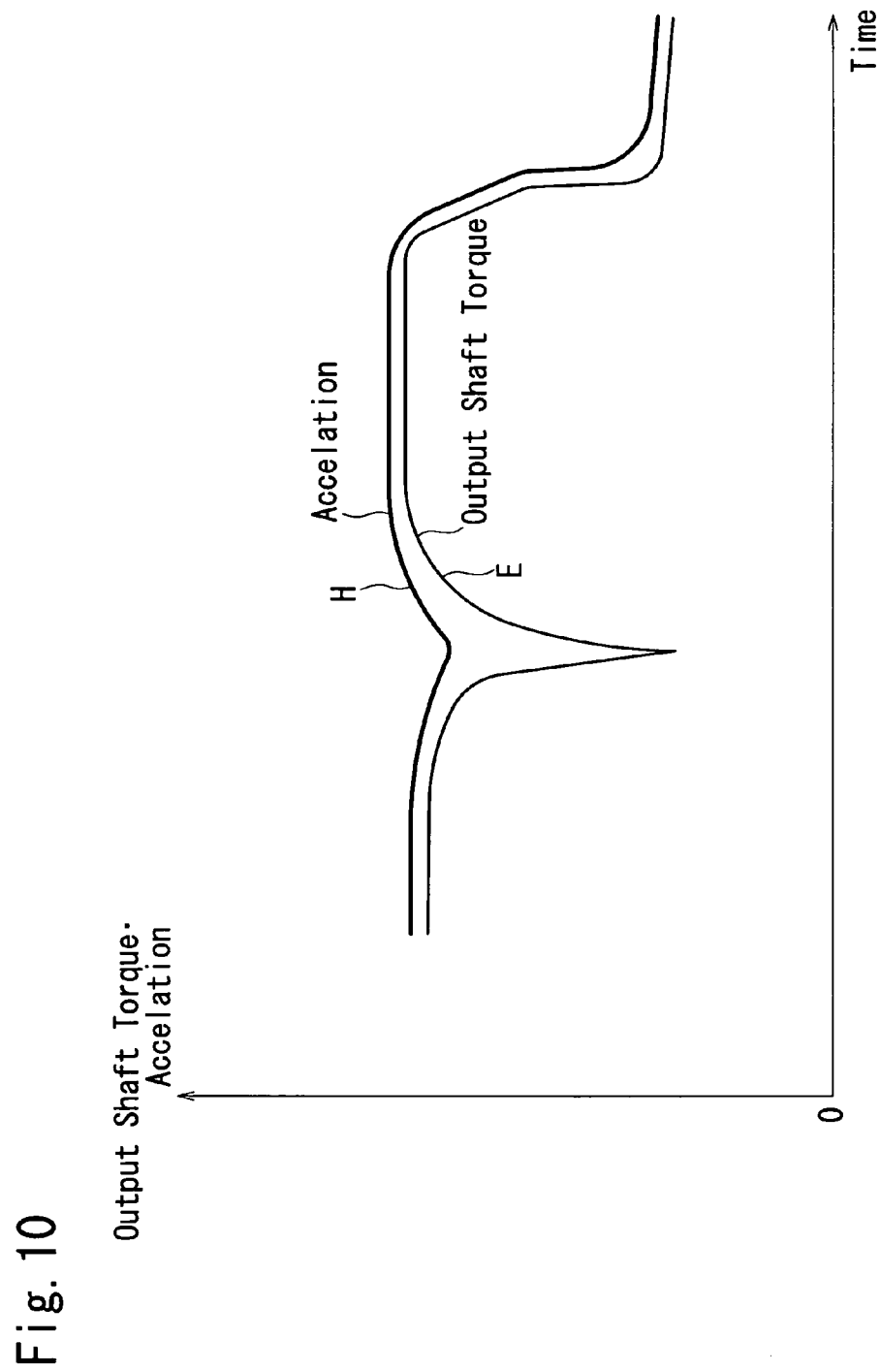
FIG. 10 is a time chart showing a relation between the output shaft torque and acceleration of a vehicle.

The engagement command pressure which the electronic control unit 81 commands to the 2-4 speed brake solenoid 42 is corrected using the maximum rate of change of the gear ratio. Therefore, it is possible to stably realize the output shaft torque shown by the solid line E in FIG. 10 in which reduction of acceleration due to torque phase does not occur in the acceleration of the vehicle, without generating a rapid rise and prolongation of the output shaft torque that is apt to occur when hydraulic pressure, $\mu$ of the frictional material or input torque disperses.

As a result, shift of a comfortable feeling wherein fluctuation of the output shaft torque has no strong influence on the acceleration of the vehicle can be achieved.

In addition, although correction of the engagement command pressure is performed based on rate of change of gear ratio in this embodiment, as a first modified example, the correction of the engagement command pressure can be also performed based on a gear ratio at the time after it is detected that a gear ratio becomes smaller than a gear ratio in the gear speed positions before shift, and a predetermined time elapsed from start of inertia phase.

Concretely speaking, the gear ratio detecting unit 89 shown in FIG. 2 calculates a gear ratio at the time the predetermined time elapsed from the start of inertia phase. When the calculated gear ratio is smaller than a first gear ratio, the electronic control unit 81 decides that the gear ratio changes rapidly and that the output shaft torque rises rapidly and corrects the engagement side learning pressure in the decrease direction. Moreover, when the calculated gear ratio is larger than a second gear ratio, the electronic control unit 81 decides that shift takes a long time and corrects the engagement side learning pressure in the rise direction.

Thereby, the correction of the engagement command pressure can be performed properly as in the above embodiment.

Further, as another modified example, the correction of the engagement command pressure can be also performed as in the above example by using the turbine speed (input shaft speed) on which calculation of gear ratio is based or the output shaft speed instead of the gear ratio in the above-mentioned first example.

Alternatively, correction of the engagement command pressure can be also performed based on a time that elapsed until the hydraulic switch 87 is turned ON from the shift control start (time t1 in FIG. 5). Concretely speaking, the rise of hydraulic pressure is slow when the time that elapsed until the time the hydraulic switch 87 is turned ON from the time the shift control start is longer than a first predetermined time, the engagement side learning pressure is corrected in the rise direction. And, when the time that elapsed until the time the hydraulic switch 87 is turned ON from the time the shift control start is shorter than a second predetermined time, the engagement side learning pressure is corrected in the decrease direction. Thereby, the correction of the engagement command pressure can be properly performed as in the above-mentioned embodiment.

Further, the correction of the engagement command pressure can be also performed based on a rate of change of the output shaft speed or amplitude of vibration of the speed. In this case, when the rate of change of the output shaft speed is larger than a first predetermined speed or when the amplitude of vibration of the speed is larger than a first predetermined value, it is determined that the thrust-up shock occurs in the vehicle, and the engagement side learning pressure is rewritten in the decrease direction. On the other hand, when the rate of change of the output shaft speed is smaller than a second predetermined value or when the amplitude of the vibration of the speed is smaller than a second predetermined value, it is determined that a shift shock that occurs in the vehicle is small and that the shift takes a long time, and the engagement side learning pressure is rewritten in the rise direction. Thereby, the correction of the engagement command pressure can be performed as in the above-mentioned embodiment.

In addition, the correction of the engagement command pressure in the above-mentioned respective examples is not limited to hydraulic pressure supplied to the 2-4 speed brake 2-4/B and can be applied to hydraulic pressure that actuates other engagement elements having function to advance upshift by increasing capacity.

Moreover, the correction of the engagement command pressure in the above-mentioned respective examples can be also applied to an automatic transmission having another power train, structure of engagement elements and hydraulic pressure system structure that are mentioned in this embodiment.

Further, although the hydraulic switch is used to estimate the piston stroke position of the piston that biases the friction disc of the 2-4 speed brake 2-4/B, the piston stroke position can be also estimated using a piston stroke sensor detecting the piston stroke position, a timer or the like instead.

Figure 11:
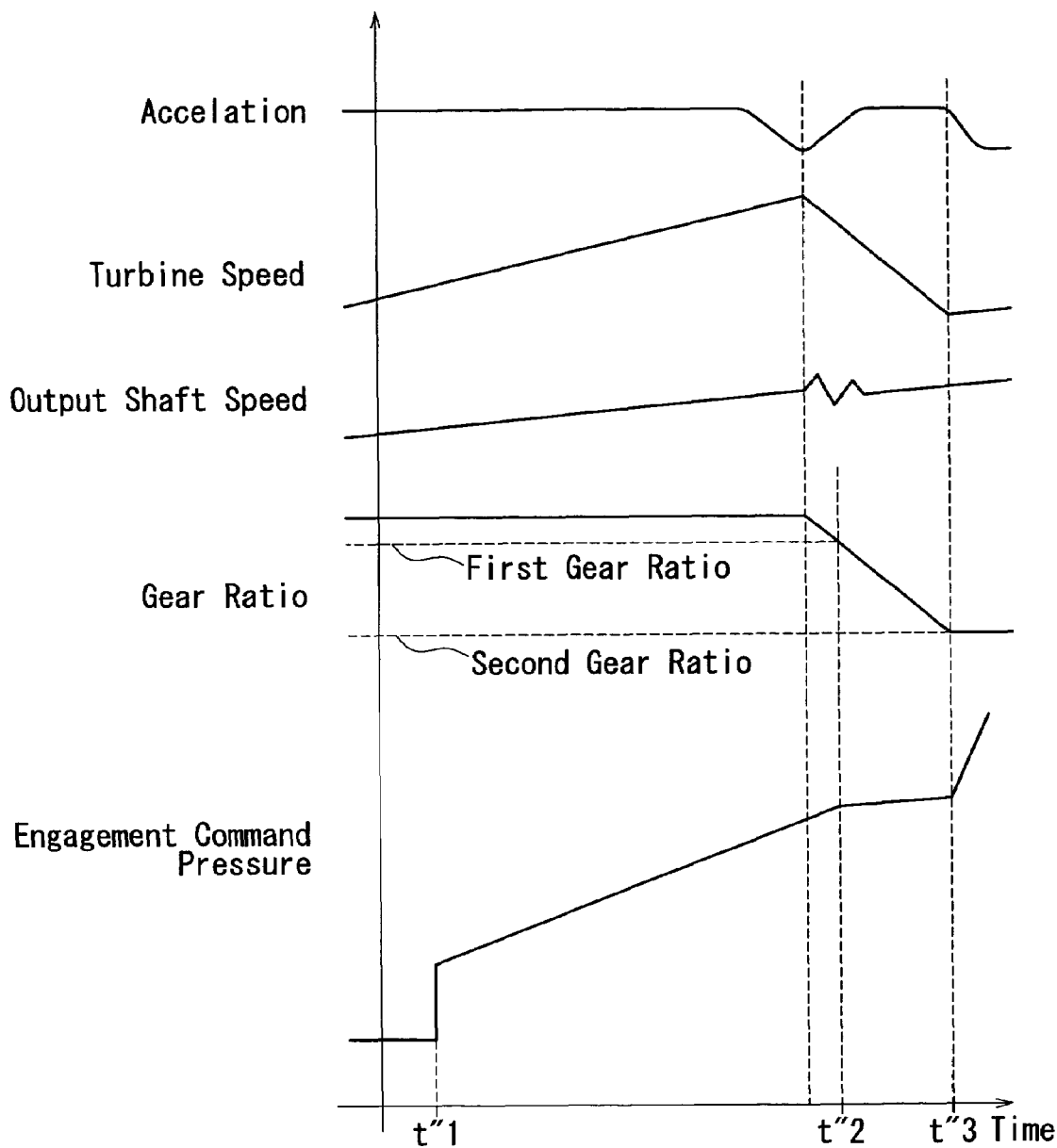
FIG. 11 is a time chart showing a change of the engagement command pressure.

Alternatively, in the above embodiment, although the engagement command pressure till the inertia phase start is detected is divided into a piston stroke control command pressure and a torque phase advance command pressure, and the engagement command pressure is increased at two different rise gradients as shown in FIG. 5, the torque phase can be also advanced by commanding an engagement command pressure with the same rise gradient until the inertia phase is detected (time t"2) since start of upshift is detected, as shown in FIG. 11.

What is claimed is:

1. A hydraulic control system for an automatic transmission, comprising:
   an input shaft drivable by a rotational power of an engine;
   an output shaft for outputting a rotational power to a drive wheel of a vehicle;
   a hydraulic control unit for supplying hydraulic pressure;
   an engagement element for performing a shift to a higher speed gear from a lower speed gear, wherein the engagement element is placed in engaged state with hydraulic pressure supplied from the hydraulic control unit and;
   an electronic control unit for outputting to the hydraulic control unit a hydraulic pressure value of hydraulic pressure supplied to the engagement element; and
   a gear ratio detecting unit for detecting an inertia phase from a change of a gear ratio corresponding to a speed ratio between the input shaft and the output shaft and detecting a gear ratio at the time of the inertia phase,
   wherein the electronic control unit outputs the hydraulic pressure value as an engagement command pressure to the engagement element until the time the start of the inertia phase is detected, corrects the engagement command pressure on the basis of the gear ratio detected by the gear ratio detecting unit, and sets the corrected engagement command pressure as a next engagement command pressure at a next shift to the higher speed gear from the lower speed gear.

2. A hydraulic control system for an automatic transmission according to claim 1, wherein the electronic control unit calculates a maximum value of a rate of change of a gear ratio within a predetermined time from the start of the inertia phase, corrects the engagement command pressure in an increasing direction when the maximum value of the rate of change of the gear ratio is smaller than a first predetermined rate of change of a gear ratio, corrects the engagement command pressure in a decreasing direction when the maximum value of the rate of change of the gear ratio is larger than a second predetermined rate of change of a gear ratio, and sets the corrected engagement command pressure as the engagement command pressure at a next shift to the higher speed gear from the lower speed gear.

3. A hydraulic control system for an automatic transmission according to claim 1, wherein the electronic control unit corrects the engagement command pressure in the decreasing direction when the gear ratio, after a predetermined time from the start of the inertia phase, is smaller than a first predetermined gear ratio, corrects the engagement command pressure in the increasing direction when the gear ratio is larger than a second predetermined gear ratio, and sets the corrected engagement command pressure as the engagement command pressure at a next shift to the higher speed gear from the lower speed gear.

4. A hydraulic control system for an automatic transmission according to claim 1, wherein the electronic control unit corrects the engagement command pressure in the increasing direction when a rate of change of an input shaft speed, after a predetermined time from the start of the inertia phase, is smaller than a first predetermined rate of ratio of the input shaft speed, corrects the engagement command pressure in the decreasing direction when the rate of change of the input shaft speed is larger than a second predetermined rate of change of the input shaft speed, and sets the corrected engagement command pressure as the engagement command pressure at a next shift to the higher speed gear from the lower speed gear.

5. A hydraulic control system for an automatic transmission according to claim 1, wherein the electronic control unit corrects the engagement command pressure in the increasing direction when a rate of change of an output shaft speed, after a predetermined time from the start of the inertia phase, is smaller than a first predetermined rate of change of the output shaft speed, corrects the engagement command pressure in the decreasing direction when the rate of change of the output shaft speed is larger than a second predetermined rate of change of the output shaft speed, and sets the corrected engagement command pressure as the engagement command pressure at a next shift to the higher speed gear from the lower speed gear.

6. A hydraulic control system for an automatic transmission according to claim 1, wherein the electronic control unit outputs a piston stroke control command pressure for advancing a piston stroke as the engagement command pressure to the engagement element, then outputs a torque phase advance command pressure for advancing the torque phase as the engagement command pressure until the time the gear ratio detecting unit detects the start of the inertia phase, and corrects the piston stroke control command pressure to correct the torque phase advance command pressure.

7. A hydraulic control system for an automatic transmission according to claim 6, further comprising a hydraulic switch for detecting a hydraulic pressure value of a hydraulic pressure actuating the engagement element, wherein the electronic control unit outputs the piston stroke control command pressure as the engagement command pressure until the time the hydraulic switch detects a predetermined hydraulic pressure value, and outputs the torque phase advance command pressure as the engagement command pressure after the hydraulic switch detects the predetermined hydraulic pressure value until the time the gear ratio detecting unit detects the start of the inertia phase.

8. A hydraulic control system for an automatic transmission according to claim 6, further comprising a piston stroke sensor for detecting an operating stroke position of a piston, which is a drive unit of the engagement element, wherein the electronic control unit outputs the piston stroke control command pressure as the engagement command pressure until the time the piston stroke sensor detects that the piston reaches a predetermined position, and outputs the torque phase advance command pressure as the engagement command pressure after the piston stroke sensor detects that the piston reaches the predetermined position until the time the gear ratio detecting unit detects the start of the inertia phase.

9. A hydraulic control system for an automatic transmission according to claim 1, wherein the correction of the engagement command pressure is performed in such a way that a correction amount of the engagement command pressure in a decreasing direction is made to be larger than a correction amount of the engagement command pressure in an increasing direction.

* * * * *